United States Patent
Kuno (10) Patent No.: US 6,567,121 B1
(45) Date of Patent: May 20, 2003

(54) CAMERA CONTROL SYSTEM, CAMERA SERVER, CAMERA CLIENT, CONTROL METHOD, AND STORAGE MEDIUM

(75) Inventor: Tomoko Kuno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/955,700

(22) Filed: Oct. 23, 1997

(30) Foreign Application Priority Data

Oct. 25, 1996 (JP) .............................................. 8-284448
Oct. 8, 1997 (JP) .............................................. 9-276080

(51) Int. Cl.⁷ ........................ H04N 5/232; H04N 5/225
(52) U.S. Cl. .................... 348/211.3; 348/207.1
(58) Field of Search .................... 348/211, 213, 348/214, 14.1, 143, 207.1, 207.11, 211.99, 211.1, 211.3, 211.4, 211.5, 211.7, 211.8, 211.12, 552

(56) References Cited

U.S. PATENT DOCUMENTS

| | | | | |
|---|---|---|---|---|
| 5,111,288 A | * | 5/1992 | Blackshear | 348/143 |
| 5,321,396 A | * | 6/1994 | Lamming et al. | 340/825.49 |
| 5,432,871 A | * | 7/1995 | Novik | 348/14.13 |
| 5,526,041 A | * | 6/1996 | Glatt | 348/143 |
| 5,793,901 A | * | 8/1998 | Matsutake et al. | 382/294 |
| 5,929,904 A | * | 7/1999 | Uchida | 348/211 |
| 6,008,837 A | * | 12/1999 | Yonezawa | 348/211 |
| 6,137,485 A | * | 10/2000 | Kawai et al. | 348/211 |
| 6,209,048 B1 | * | 3/2001 | Wolff | 710/62 |
| 6,266,085 B1 | * | 7/2001 | Kato et al. | 348/211 |
| 6,337,709 B1 | * | 1/2002 | Yamaashi et al. | 348/143 |
| 2002/0067412 A1 | * | 6/2002 | Kawai et al. | 348/211.99 |

* cited by examiner

Primary Examiner—Aung S. Moe
(74) Attorney, Agent, or Firm—Fitzpatrick, Cella, Harper & Scinto

(57) ABSTRACT

An arrangement is provided in which previously sensed image information is stored, so that information with an angle desired by the user can be searched for and displayed. Image data sensed by a camera device (100) is captured by an image information capture unit (101) and the angle information of image data captured by the image information capture unit (101) is acquired by an image view point information acquisition unit (102). A header is generated by a header generation unit (103) based on the angle information. A recording information generation unit (104) generates recording information based on the generated header and the captured image data, and stores the generated information in an external storage device (6). Upon reception of an external search instruction, a search unit (105) searches for information matching angle information included in the search condition, and an output unit (106) outputs the found image data.

21 Claims, 10 Drawing Sheets

AUTOMATIC CAMERA IMAGE SENSING SEQUENCE

| CLIENT ADDRESS | STATUS | RIGHT OF ACCESS | SEARCH POINTER |
|---|---|---|---|
| 100. 200. 50. 15 | OBSERVATION MODE | OK | — |
| 120. 150. 80. 75 | SEARCH MODE | NG | 100 |
| 200. 50. 115. 90 | OBSERVATION MODE | NG | — |
| 150. 80. 60. 100 | SEARCH MODE | NG | 70 |
| | | | |

# CAMERA CONTROL SYSTEM, CAMERA SERVER, CAMERA CLIENT, CONTROL METHOD, AND STORAGE MEDIUM

BACKGROUND OF THE INVENTION

The present invention relates to a camera control system, camera control apparatus, camera operation device, and method, for controlling remote cameras.

Recently, the Internet has received a lot of attention. The assignee of the present invention has already disclosed some inventions that relate to camera servers connected to the Internet. According to such inventions, the user connects a desired camera server via the Internet, controls the angle (pan and tilt angles and zoom value) of a camera connected to the camera server, and can observe live images sensed by the camera. For example, when the camera of the camera server is set at a resort, tourist spot, or the like, users can enjoy images of such locations at their homes.

However, since images sensed by the camera are transferred to clients connected to the server at that time, all users at these clients can observe the images but one client (one user) alone has the right of access to control that camera, i.e., can freely operate the pan and tilt angles and zoom value. Even when the time period of the right of access to control the camera granted to a single client is limited, and the right of access to control is granted, e.g., to queued clients in turn, if a large number of clients are queued, each user cannot observe an image at his or her desired angle.

SUMMARY OF THE INVENTION

The present invention has been made in consideration of the above situation, and has as its object to provide a camera control system, camera server, camera client, control method, and storage medium, which store previously sensed image information, and can find and display information at a user's desired angle.

In order to achieve the above object, a camera control system according to the present invention comprises the following arrangement.

That is, there is provided a camera control system built by a camera server which can freely control a camera device, an angle of which can be freely controlled, and a client for displaying an image from the camera server, the client comprising:
  search condition transfer means for transferring angle information as search condition instruction information to the server; and
  display control means for displaying image data transferred from the camera server on predetermined display means, and the camera server comprising:
  storage means for storing image data sensed by the camera device and angle information of that image data in predetermined storage means;
  search means for searching the storage means in accordance with the angle information in the instruction information when the instruction information is received from the client; and
  image data transfer means for transferring the image data found by the search means to the client.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described in detail hereinafter with reference to the accompanying drawings.

First Embodiment

Figure 1:
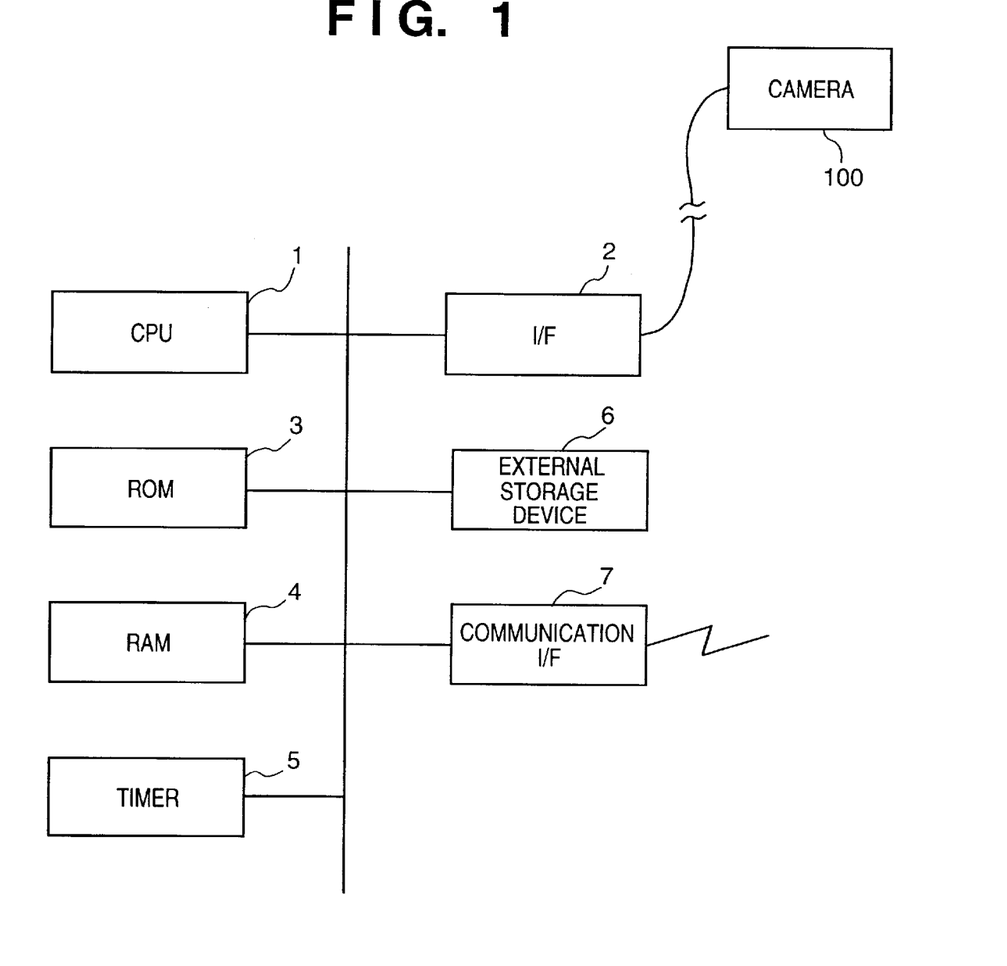
FIG. 1 is a block diagram showing the arrangement of a camera server according to the first embodiment of the present invention.
Figure 10:
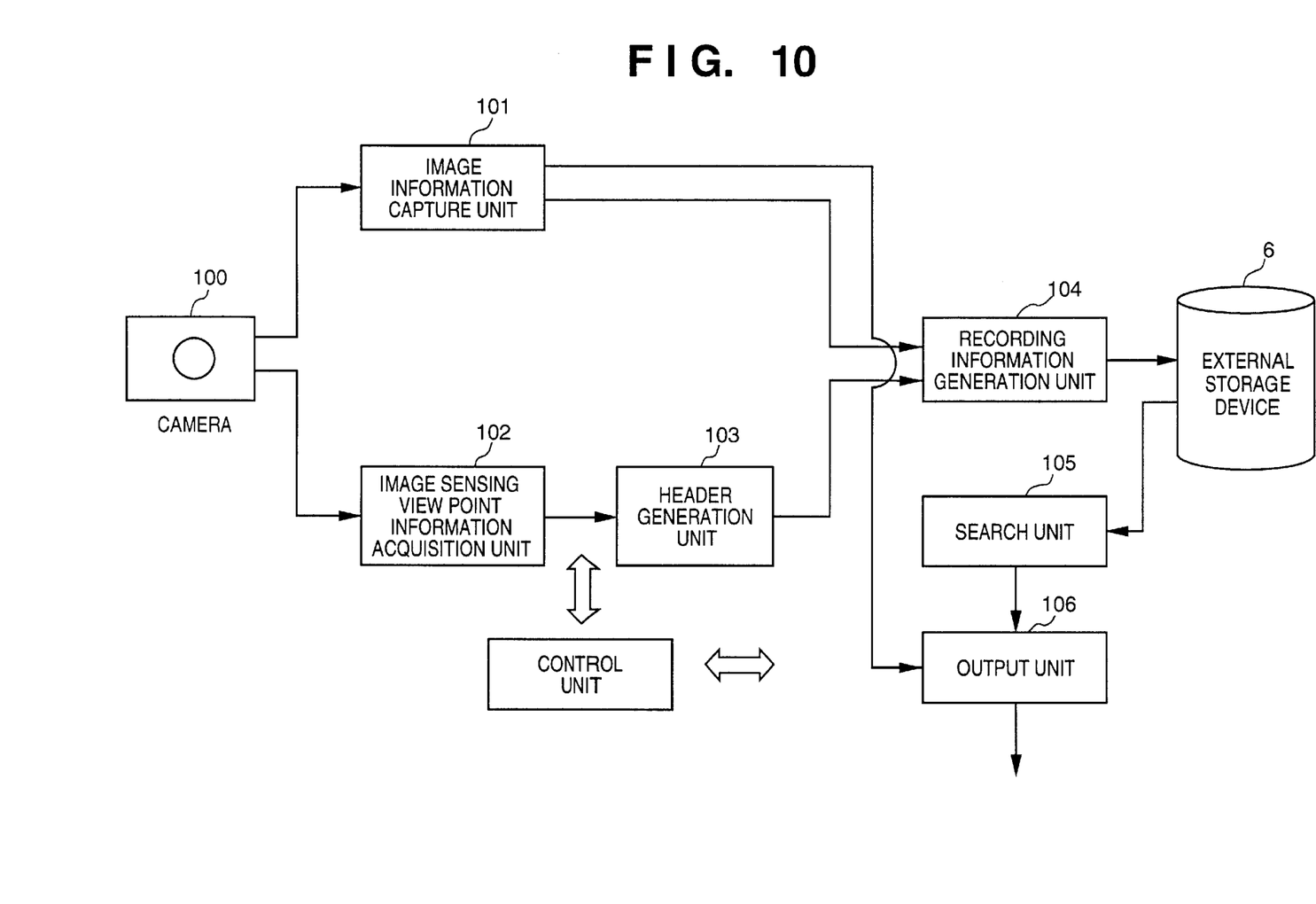
FIG. 10 is a block diagram showing the arrangement of the camera server of the first embodiment.
Figure 11:
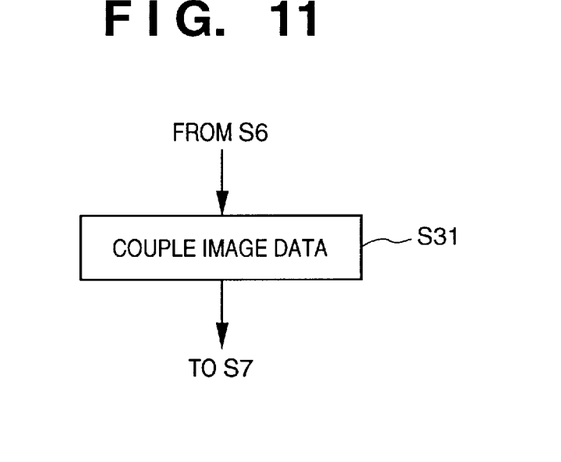
FIG. 11 is a flow chart showing a modification of the operation of the camera server.

FIG. 1 is a block diagram showing the arrangement of a camera server according to this embodiment, and FIG. 10 is a block diagram showing the detailed arrangement of the camera server.

Referring to FIG. 10, reference numeral 100 denotes a camera device, the pan and tilt angles and zoom value (to be generally referred to as an angle hereinafter) of which can be controlled; and 101, an image information capture unit for capturing image data obtained by the camera device 100. Reference numeral 102 denotes an image sensing view point information acquisition unit for acquiring the angle information of the camera at that time. If the camera device 100 can send back angle information at that time in response to an appropriate control signal, the angle information can be acquired by outputting a signal every time the angle information is required. On the other hand, if the camera device 100 does not have such function, the angle information of the camera device can always be held. Reference numeral 103 denotes a header generation unit for generating header information on the basis of the acquired header information; and 104, a storage information generation unit for synthesizing the generated header information and sensed image data in a predetermined format, and storing the synthesized data in an external storage device 6. Reference numeral 105 denotes a search unit for finding target image data by searching headers for information stored in the external storage device 6; and 106, an output unit for outputting the found image data. Reference numeral 107 denotes a control unit for controlling the entire apparatus. The control unit 107 allows an external input of a search condition and the like.

The relationship between the arrangement shown in FIG. 10 and FIG. 1 will become apparent form the following description.

Referring to FIG. 1, reference numeral 100 denotes a camera device, the angle of which can be controlled; 1, a CPU for controlling the entire apparatus that serves as a camera server; and 2, an interface for supplying various control signals to the camera device 100, receiving a status signal from the camera device 100, and also receiving sensed image data. Reference numeral 3 denotes a ROM that stores a boot program of the CPU; and 4, a RAM. Reference numeral 5 denotes a timer that measures time; and 6, an external storage device (e.g., a hard disk device) that stores an OS, and a program that implements the camera server. The CPU 1 is booted in accordance with the boot program in the ROM 3, and loads the OS and camera server program from the external storage device 6, so that the apparatus of this embodiment can serve as a camera server. The external storage device is also used for storing sensed image data in a format to be described later. Reference numeral 7 denotes a communication interface connected to the Internet.

Upon reception of a connection request from a client on the Internet (or a network), the camera server (the entire apparatus shown in FIG. 1) of this embodiment grants the right of access to a client who was connected first, and transfers a sensed image to that client. To clients who were connected in the second and subsequent places, the camera server transfers image data but does not grant any right of access. However, since unconditional grant of the right of access to a single user offends other users, the access right is granted to other users in turn by limiting the access time. The right of access is granted in the connection order.

If the number of connected users is relatively small, the connected users can observe images with free angles after they wait for an appropriate period of time. However, if a large number of clients are queued for gaining the right of access, even when the right of access is granted to each user under the condition of 5 minutes per client, a new client must wait for a considerable period of time. Above all, the user must pay a line connection fee for such wait time.

In this embodiment, the camera server stores previously sensed images, and their angle information and time information, and can transfer the stored image to clients who have no right of access, thereby solving the above-mentioned problems.

For example, assume that the user can confirm the traffic of a given road near a certain camera server by controlling its angle. In this case, images one hour or half an hour before may suffice for the user of that client to roughly estimate the road traffic.

For this purpose, the camera server of this embodiment sequentially controls the pan and tile angles (the zoom value is fixed at the telephoto end (=minimum magnification) independently of the presence/absence of connected clients at the designated time, and stores images that can be sensed by its camera in the external storage device 6. In this case, the image data is stored in correspondence with its angle information and time information. Also, the image data is stored after appropriate compression processing.

Figure 2:
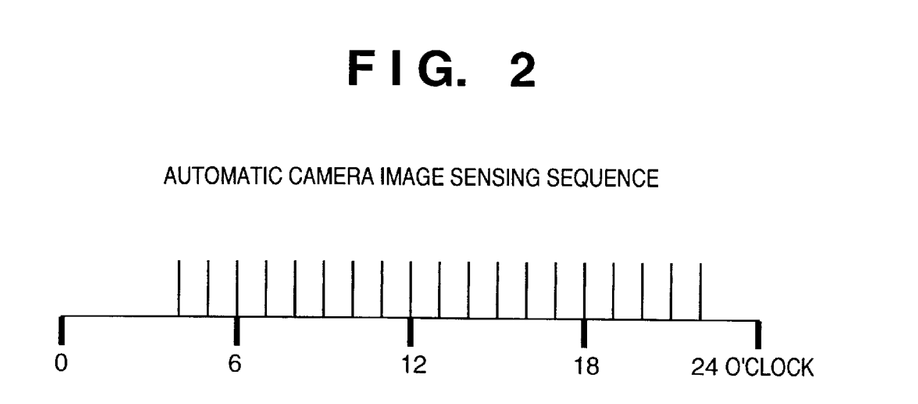
FIG. 2 is a chart showing the automatic camera image sensing sequence in the camera server of the first embodiment.

FIG. 2 shows the full view field image capturing timings. In the case of FIG. 2, full view field image capturing is done every hour during a period from 4:00 AM to 10:00 PM. The period and capture timings are controlled by the timer 5, but may be appropriately changed.

Figure 3:
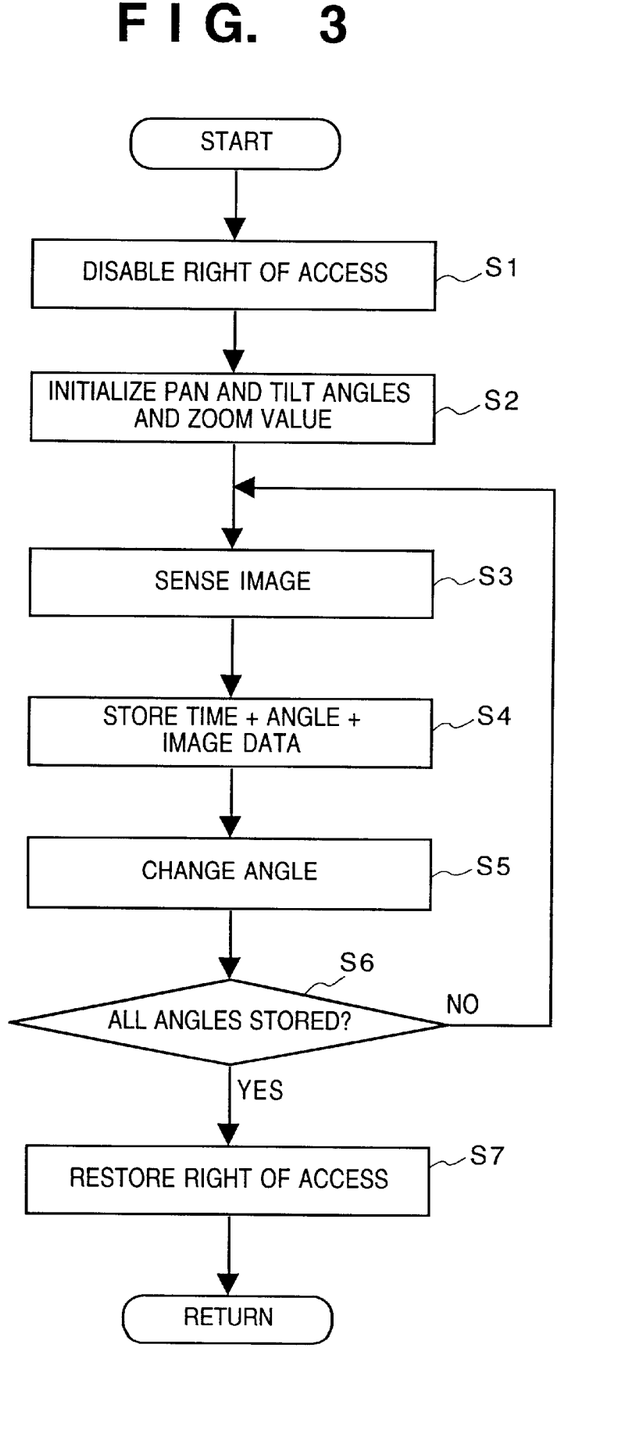
FIG. 3 is a flow chart showing the processing contents of automatic camera image sensing shown in FIG. 2.

FIG. 3 shows the processing started when the capture time has been reached. The processing will be described below with reference to the flow chart in FIG. 3.

If the capture time has reached, the right of access is temporarily disabled in step S1. If a client who has the right of access at that time is present, the camera angle at that time is saved, and a message indicating that the right of access is temporarily disabled for full view field capturing is sent to that client.

The flow advances to step S2 to initialize the pan and tilt angles (for example, the camera is controlled to point the upper left end of the photographable view field range). The zoom value is set at the telephoto end (minimum magnification).

An image is sensed at that camera angle in step S3. A header is created based on the image sensing time and angle value, and is stored in the external storage device 6 together with the obtained image data (step S4).

The flow advances to step S5 to change the angle. The above-mentioned operations are repeated until it is finally determined that images in the full view field range as the photographable range are stored (step S6).

Upon completion of capturing of images in the full view field range, the flow advances to step S7 to grant the right of access.

If a client who has temporarily lost the right of access is present, the saved angle information is read out to restore the state at the time of disabling the right of access of that client, and thereafter, the right of access is granted again to that client. At this time, a message indicating that the right of access is granted again, a message indicating gratitude, or the like may be sent.

Figure 4:
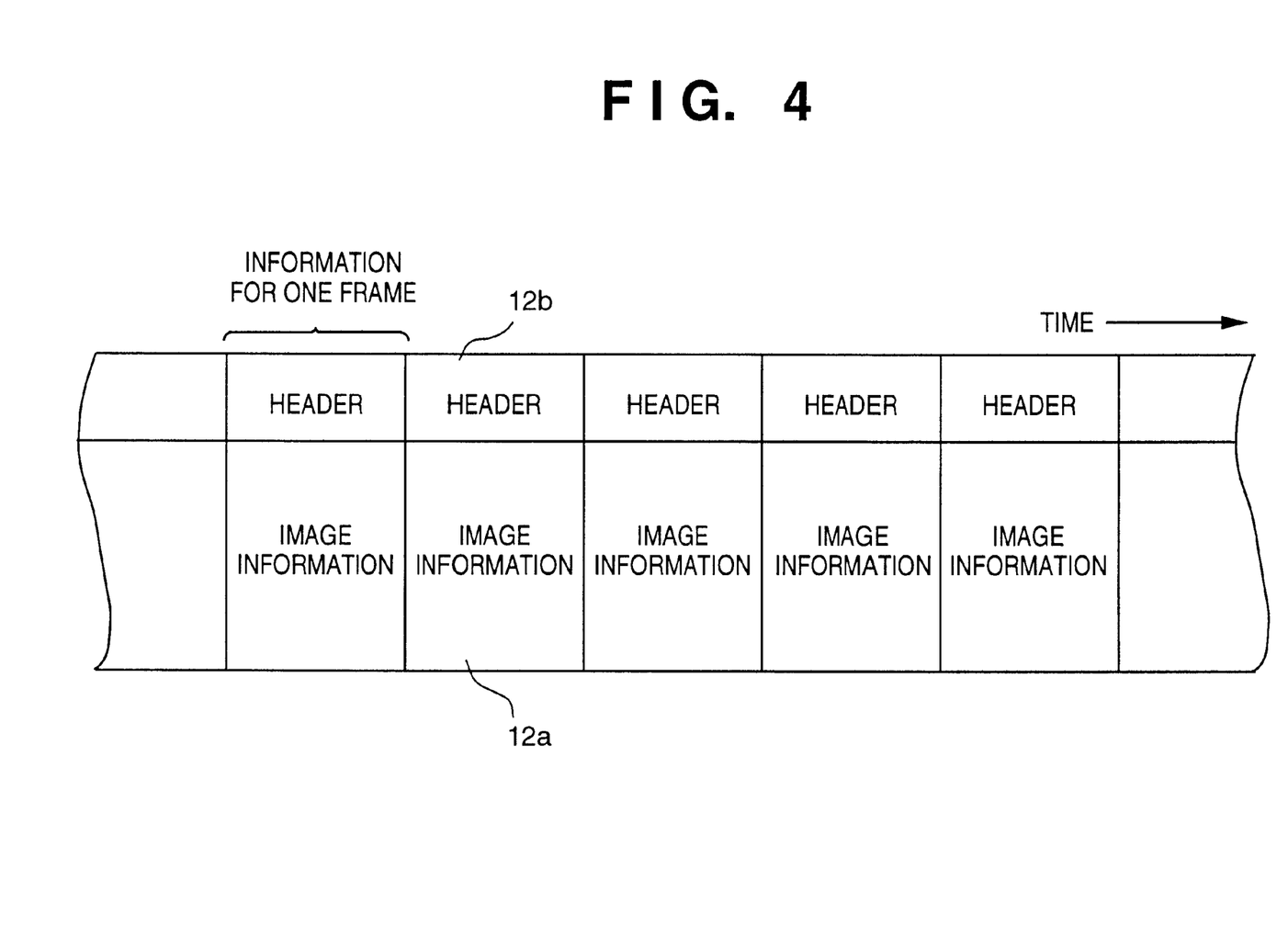
FIG. 4 shows the format of image data stored in the camera server.

FIG. 4 shows the format of image data stored in the external storage device 6, as described above. In FIG. 4, reference numeral 12*a* denotes actually sensed image data; and 12*b*, a header that stores the image sensing date and image sensing angle information (pan and tilt angles and zoom value).

Note that image data itself sensed in response to an instruction from a client with the right of camera access may also be stored in the format shown in FIG. 4. In this case, a large-capacity external storage device 6 is preferably used. In this case, if images are stored in real time, those substantially equivalent to moving images are obtained. For this reason, if the camera device has image capturing performance of 15 frames/sec, only one of 15 frames may be stored, or image data captured at the above-mentioned interval or more may be stored in the external storage device 6.

When the storage capacity is small, storage access to the external storage device 6 may be granted to only a specific client who is registered in advance, and other clients may be denied this right. In this case, authentication of a client is required, but a detailed description thereof will be omitted since a known authentication technique can be used.

Since the external storage device 6 has a finite storage capacity, the sensed images are not permanently stored, but are overwritten in the order of older image data when the capacity is about to exceed or a predetermined capacity has been reached.

When image data are stored in units of clients on the basis of client registration information, the storage capacities are determined in units of clients, and old image data are erased in units of clients. As another method, when the storage capacity of each client is about to be exceeded, the server may reduce already stored images in accordance with an instruction from a client, and transmit a multi-image list made up of reduced-scale images to that client. The client user may select images to be erased from the multi-image list, and the server may erase the selected images.

The right of access to one camera is granted to only one user. Other connected users observe images. In this case, the users who are queued for gaining the right of access (may include the user of the client with the right of access) can freely observe images which have been sensed and stored, as described above.

In this case, the client transfers a predetermined search command and its condition data to the camera server.

Prior to a description of the processing contents of the camera server that implements this processing, the arrangement and operation of the client will be explained below.

Figure 6:
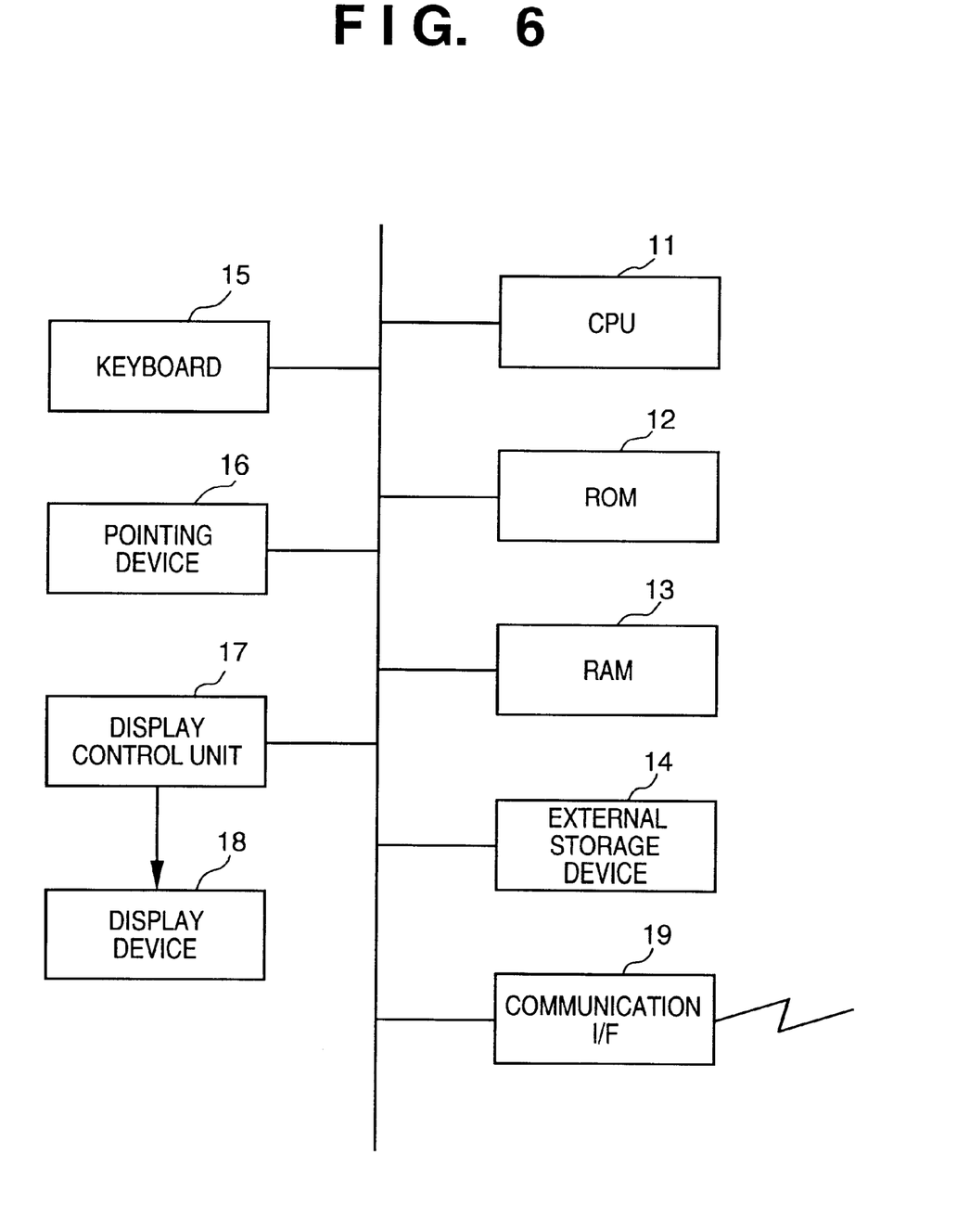
FIG. 6 is a block diagram showing the arrangement of a client apparatus of the first embodiment.

FIG. 6 is a block diagram showing the arrangement of an apparatus that serves as a client.

Referring to FIG. 6, reference numeral 11 denotes a CPU for controlling the entire apparatus; and 12, a ROM that stores a boot program, BIOS, and the like. Reference numeral 13 denotes a RAM which loads one of various kinds of OS programs, browser program, and the like to control this apparatus to serve as an Internet client apparatus. Reference numeral 14 denotes an external storage device which stores a browser program, various application programs, and data; 15, a keyboard; 16, a pointing device; 17, a display control unit (made up of a VRAM, a drawing chip, and the like); and 18, a display device. Reference numeral 19 denotes a communication unit, which is used for connecting the camera server shown in FIG. 1.

The above-mentioned arrangement can be realized by recent personal computers or workstations.

Figure 7:
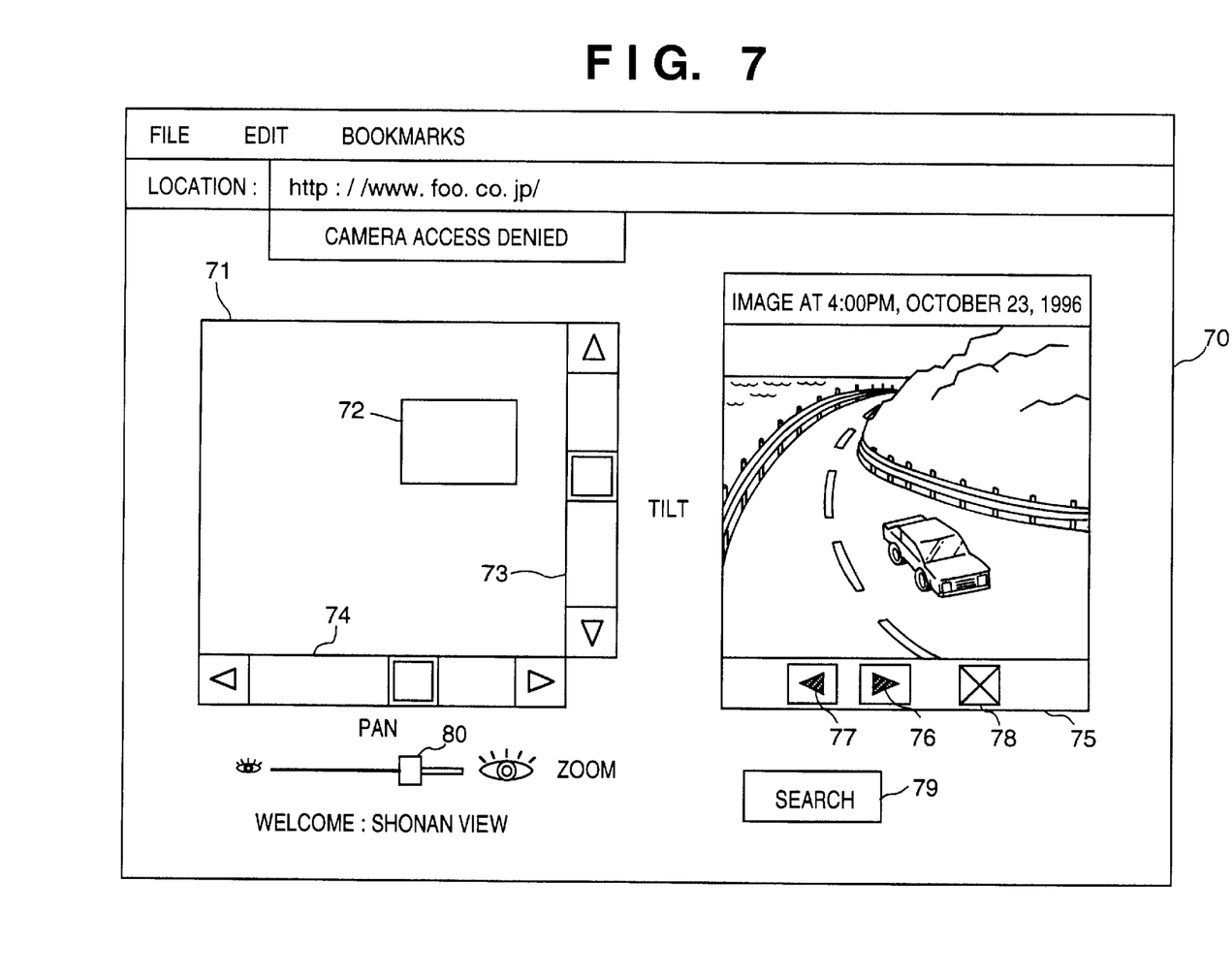
FIG. 7 is a view showing an example of a window displayed on the client apparatus.

FIG. 7 shows a window displayed when the browser program runs on the client apparatus shown in FIG. 6. FIG. 7 shows a state wherein a connection to the camera server (its address (URL) is "//www.foo.co.jp/") has been established, but the client is not granted the right of access to the server (a message "camera access denied" is displayed).

Reference numeral 71 denotes a maximum image sensing view field range of that camera; and 72, a current image sensing view field range of that camera. Reference numerals 73 and 74 denote scroll bars for respectively controlling the tilt and pan angles; and 80, a bar for controlling the zoom ratio. However, in the illustrated state, since this user is not granted the right of camera access, these bars for controlling the angle do not work (i.e., these bars are displayed in an inactive state)

Reference numeral 75 denotes a frame for displaying an image sent from the camera server. Normally, an image with an angle set by another user with the right of access is displayed on this frame. Note that an image is sent from the camera server in a compressed state, and is expanded and displayed by internal processing.

In this state, when the user locates a cursor that interlocks the pointing device 16 at the position of a button 79 named "search" in FIG. 7, and presses down a button of the pointing device (this operation will be called "clicking" hereinafter), a search conditional formula can be input to the connected camera server.

Although a key input window is not shown, assume, e.g., that the user inputs:

search.time 1996.10.23.13-02:P50T20

This formula means:

"search for an image sensed at a pan angle of 50° and tilt angle of 20° within a 2-hour range from 13:00, Oct. 23, 1996"

When the user inputs this condition and clicks, e.g., an OK button of a window displayed at that time, the client sends the following transfer request character string that complies with the Internet to the connected camera server:

//www.foo.co.jp/search.time 1996.10.23.13-02:P50T20

When the camera server (FIG. 1) receives this character string and determines that a character string at the head of the received string is one of reserved words, it interprets the entire string "search . . . " not as a file name but as a command.

As a consequence, the camera server searches data stored in its own external storage device 6. This search process is attained by checking headers. If a header that matches the condition is found, corresponding image data is transferred to the client. An image displayed on the frame 75 in FIG. 7 is the one that matched the input condition.

Unlike a normal live image, when the search processing is done, the image sensing date of that image is displayed on the upper portion of the frame 75 in FIG. 7, and page turn buttons 76 and 77, and a button 78 for instructing to end the search mode are displayed on the lower portion of the frame 75.

The page turn button 76 is an instruction button used for observing the next image, and the button 77 is used for instructing to display the previous image. With these buttons, images which are stored at predetermined time intervals and have the same angle can be displayed in turn.

When each of the buttons in the search mode is clicked, a pre-defined character string such as pagedown, pageup, seachend, or the like can be transferred after the address of the camera server, as in the above-mentioned search condition.

Figure 8:
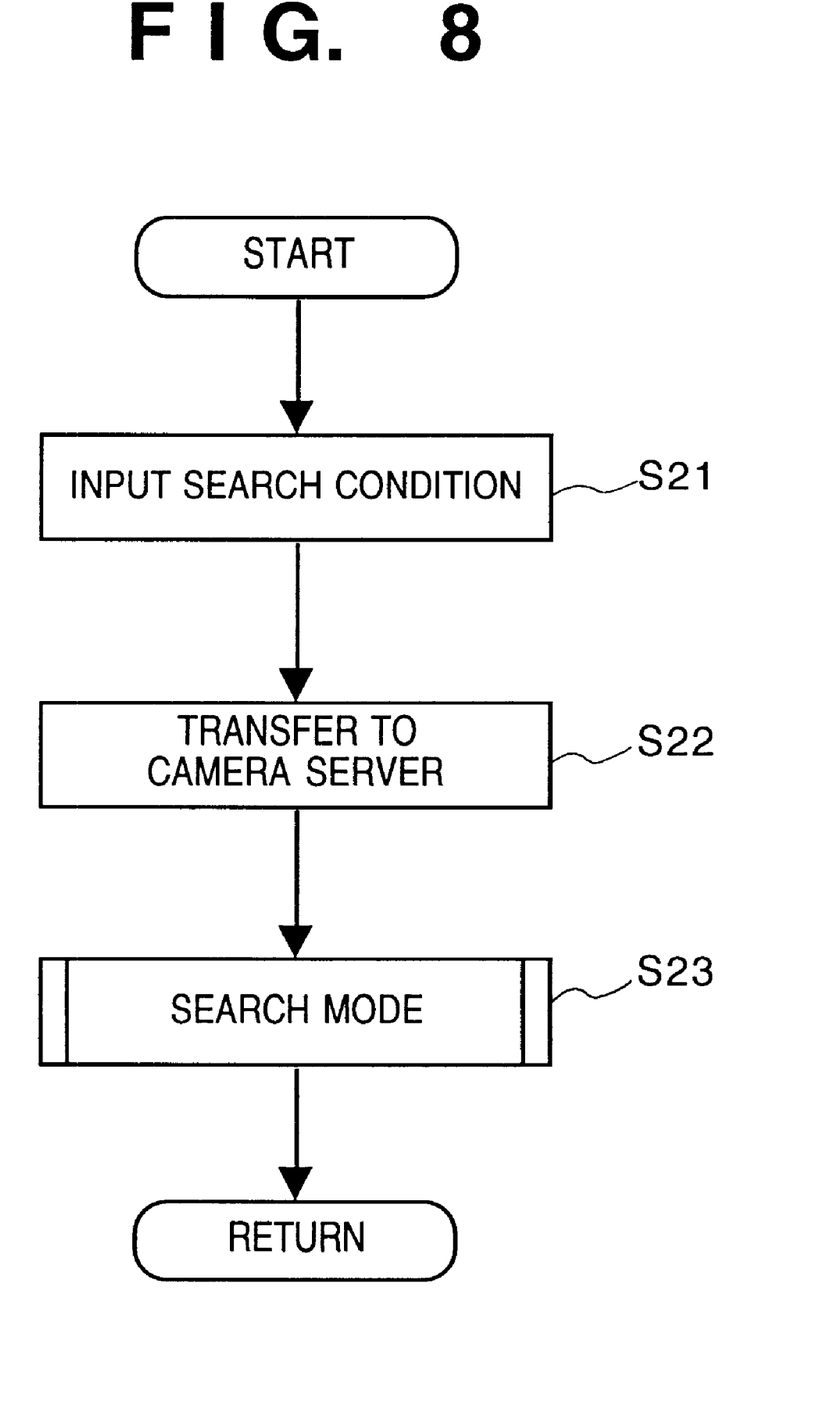
FIG. 8 is a flow chart showing the input processing of a search condition on the client apparatus.

FIG. 8 is a flow chart showing the processing contents when the search button 79 is clicked on the client apparatus.

In step S21, the window for inputting a search condition is displayed to allow the user to key-input a search condition. Upon completion of the key input, the input character string is joined after the address of the camera server, and is transferred to the camera server. In response to this character string, the camera server starts to search for an image that matches the input condition. When the search condition is transferred to the camera server in step S22, the client apparatus enters the search mode, and displays the buttons 76, 77, and 78 shown in FIG. 7.

In accordance with instructions from the client, the camera server transfers a live image or a previously sensed image. The processing contents of the camera server for meeting such requests will be explained below.

Note that, in the following description, a mode in which a live image is transferred, and the client observes the live image will be referred to as an "observation mode", and a mode in which the client observes the previously sensed image by inputting the above-mentioned search condition will be referred to as a "search mode" so as to distinguish between these modes.

Figure 9:
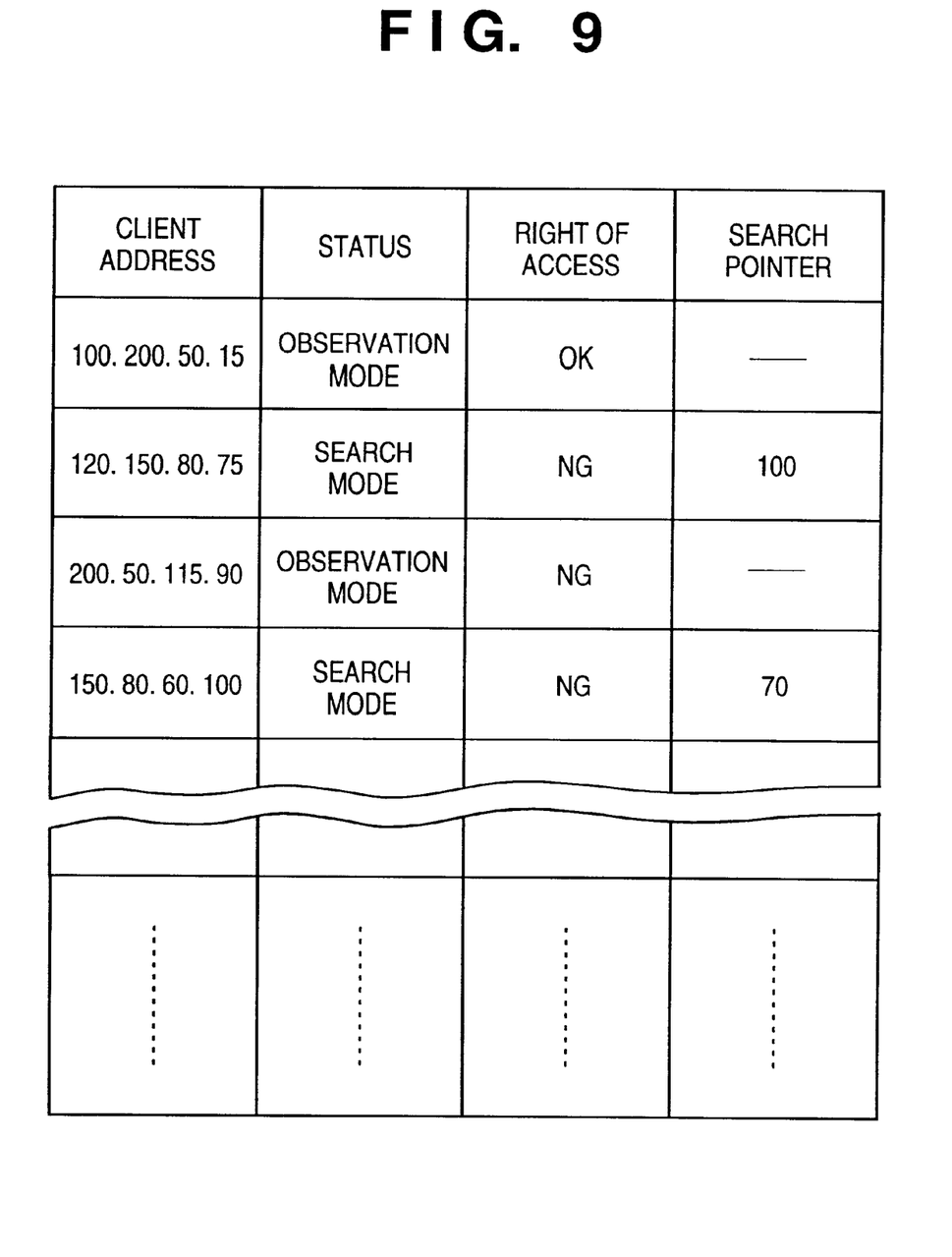
FIG. 9 shows an example of a client management table in the camera server.

FIG. 9 shows an example of a client management table assured in advance in the external storage device 6 of the camera server.

In FIG. 9, four clients are connected to the server, and the uppermost client is granted the right of camera access. As is understood from FIG. 9, the second and subsequent clients are queued for gaining the right of camera access. Since the first and third clients are in the "observation mode", they observe a live image, and the second and third clients are in the "search mode".

A search pointer in FIG. 9 is information assigned to only clients in the "search mode", and can be considered as the record numbers of images transferred to the individual clients. That is, as described above, when clients enter the search mode, they can turn pages by clicking the previous or next page button. For this reason, the pointer is assigned to detect the current position of an image. Since the search conditional formula from each client can be stored in, e.g., a RAM unless it is changed, it is not stored in the table shown in FIG. 9.

Figure 5:
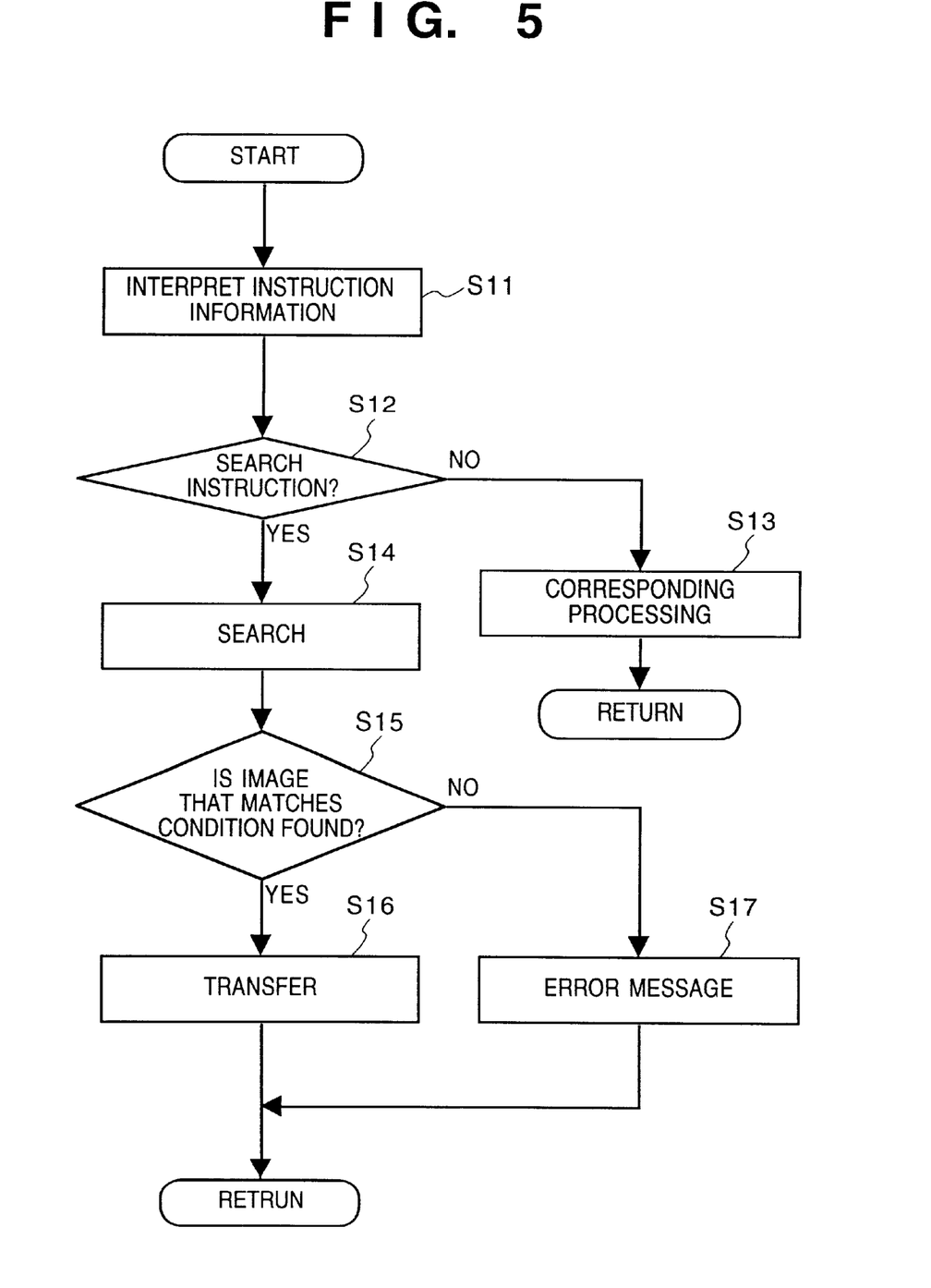
FIG. 5 is a flow chart showing the operation processing of the camera server.

The operation processing of the camera server will be explained in detail below with reference to the flow chart in FIG. 5. Note that this flow charts starts when the server receives an instruction command from the client.

In step S11, instruction information from the client is interpreted. The flow then advances to step S12 to check if the instruction command is associated with the search mode.

If it is determined that the client of interest is set in the "observation mode" so far, the "search mode" is set at that time, and the pointer is initialized to "0" (indicating the oldest image data).

The flow advances to step S14 to start searching the headers of image data from the record number indicated by the pointer at that time. In the initial state, since the pointer is "0", the headers are searched by incrementing the pointer.

The flow advances to step S15 to check if a header that matches the input condition is found. If a header that matches the input condition is found, the flow advances to step S16 to transfer the corresponding image data and its image sensing date information to the client that requested that image in accordance with a predetermined format.

On the other hand, if a header that matches the input condition cannot be found, the flow advances to step S17 to transfer information indicating the absence of the requested image to the client.

By executing the above-mentioned operations every time an instruction command from the client is received, the client can observe an image that matches the input condition at the beginning of the search, and thereafter, can observe an image of the next page by clicking the page turn button, i.e., image data which are temporally successively sensed at predetermined time intervals, and have the same angle.

As described above, according to this embodiment, image data that matches a target angle is found from the sensed image data, and the found image data can be displayed. Also, by setting the time zone to be searched, a search can be done within a desired time zone. In addition, since such accesses can be made even when that client is not granted the right of access, the user may not be able to observe a live image but can observe a desired image, thus providing a very effective, user friendly interface.

In the above description, the presence/absence of the required image data in the search processing of the camera server is preferably determined within a certain range. That is, the angle information instructed by the search condition input by the user is normally determined under the assumption that the target object image is located at the central position of the frame 75. Hence, even when the angle differs albeit slightly, images that include the target object within the angle should be retrieved. Such decision can be done by checking whether or not the instructed object is present within the view field range since the view field range can be determined on the basis of the angle information (also, the central line of the lens of the camera) stored in the external storage device 6 and the zoom value at that time.

Furthermore, the browser program on the client side in this embodiment prompts the user to input a search conditional formula upon depression of the search button. Alternatively, when information is transferred from the camera server in the HTML format, a search input frame can be displayed within the window 70, and the client side can use a normal browser.

Second Embodiment

In the first embodiment, a user program with a GUI is prepared to make a search. However, in the second embodiment, a search is done using an HTML viewer, HTML page, and CGI.

Figure 12:
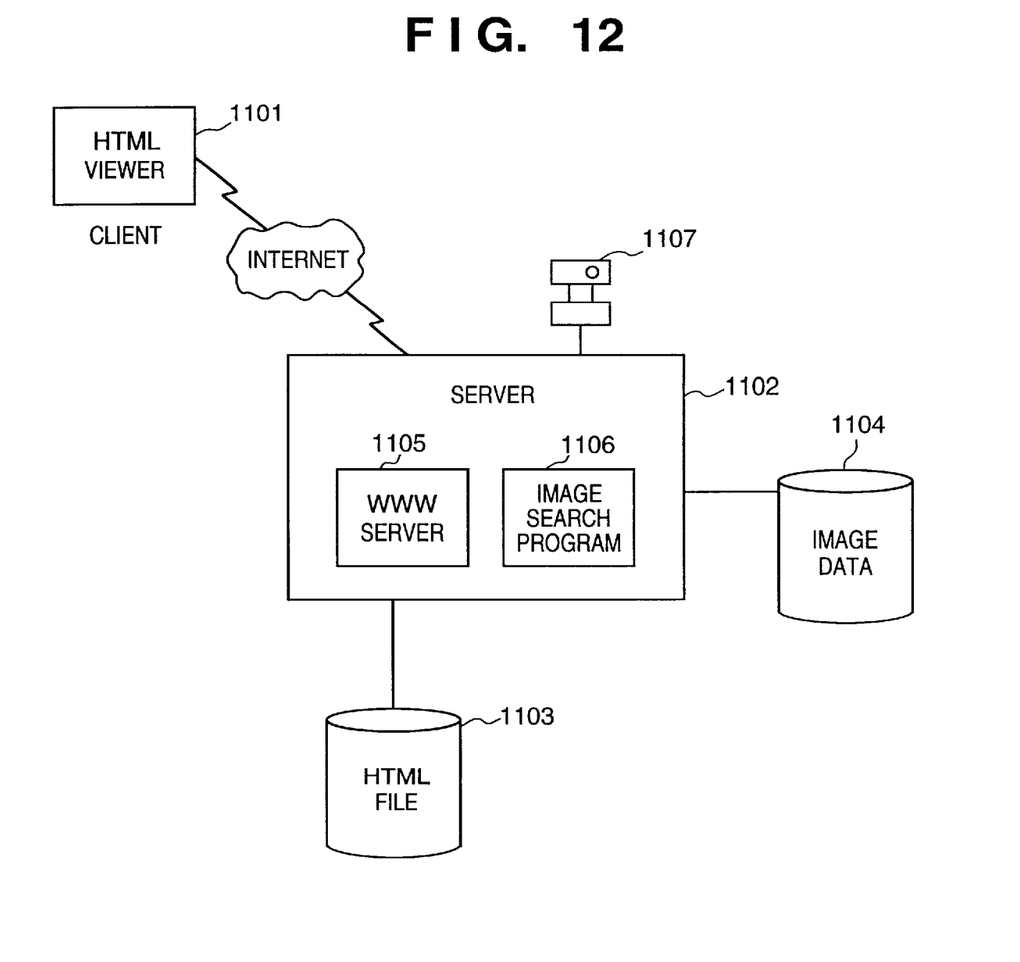
FIG. 12 is a block diagram showing the arrangement of a system according to the second embodiment of the present invention.

FIG. 12 is a block diagram showing the arrangement of the system of the second embodiment. Reference numeral 1101 denotes a PC on which an HTML viewer is installed, and which is connected to the system via the Internet. Reference numeral 1102 denotes a server made up of a WWW server 1105, an HTML file system 1103, an image search program 1106, and an image database 1104.

The PC 1101 accesses the WWW server 1105 to read an HTML file including a camera image.

The HTML file includes a CGI call.

For example, if a string:
<IMG SRC="http://www.foo.co.jp/search.p50t20">is written on the HTML page, an acquisition request of an image file "http://www.foo.co.jp/search.p50t20" is sent from the user who has downloaded that HTML page to the server "www.foo.co.jp". A string "search.p50t20" includes a call command of the search program 1106 and its parameters "the latest image with a pan value= 50 and a tilt value=20". In response to this command, the server searches for the latest image with the pan angle=50° and tilt angle=20°, as described above, retrieves the corresponding image from the image database 1104, and transmits it to the PC 1101. As a result, a page including the latest image is displayed on the PC 1101.

The user can always observe the latest image by accessing this HTML page since the server searches for the latest image with that angle and transmits the found image. On the other hand, when the features of angles such as "Zushi viewed from Shonan", "Enoshima viewed from Shonan", and the like are written on this HTML page, images sensed by the single camera can be searched for different angles by the Internet search engine.

For example, the following HTML files can be prepared:
as shonan-enoshima.html,
<HTML>
<TITLE>Enoshima viewed from Shonan</TITLE>
<BODY>
<IMG SRC="http://www.foo.co.jp/search.p50t20">
</BODY>
</HTML>
as shonan-zushi.html,
<HTML>
<TITLE>Zushi viewed from Shonan</TITLE>
<BODY>
<IMG SRC="http://www.foo.co.jp/search.p-50t-20">
</BODY>
</HTML>

Note that the present invention may be applied to either a system made up of a plurality of devices or an apparatus consisting of a single device.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, since previously sensed image information is stored, information with an angle desired by the user can be searched for and displayed.

As many apparently widely different embodiments of the present invention can be made without departing from the spirit and scope thereof, it is to be understood that the invention is not limited to the specific embodiments thereof except as defined in the appended claims.

What is claimed is:

1. A camera control system including a camera server which can freely control a camera device, an angle of which can be freely controlled, and a remote client for displaying an image from said camera server,
    said remote client comprising:
        a search condition transfer module that transfers angle information as search condition instruction information to said camera server during a time another remote client is controlling operation of the camera device; and
        a display control module that displays image data transferred from said camera server on predetermined display means, and
    said camera server comprising:
        a storage module that stores in predetermined storage means a plurality of image data sensed by the camera device and angle information for each of the plurality of image data;
        a search module that searches the predetermined storage means in accordance with the angle information in the search condition instruction information when the search condition instruction information is received from said remote client; and
        an image data transfer module that transfers the image data found by said search module to said remote client.

2. The system according to claim 1, wherein said storage module also stores image sensing date information, and
    said search condition transfer module transfers time zone information as a search condition.

3. The system according to claim 1, wherein said camera server senses an image within a photographable range by sequentially changing an angle of the camera device when a pre-set time is reached.

4. The system according to claim 1, wherein said camera server further comprises:
    a live image transfer module that transfers current image data sensed by said camera device during the time the camera device is being operated by another remote client,
        wherein said transfer module transfers the searched image data while the live image is transferred by said live image transfer module.

5. A camera server for use with a camera device, an angle of which can be freely controlled, where said camera server transfers an image sensed by the camera device to a remote client in accordance with an instruction from the remote client, said camera server comprising:
    a storage module that stores a plurality of image data sensed by the camera device and angle information for each of the plurality of image data;
    a search module that searches said storage module in accordance with the angle information in the instruction when the instruction is received from the remote client during a time another remote client is controlling operation of the camera device; and
    an image data transfer module that transfers the image data found by said search module to the remote client.

6. The camera server according to claim 5, wherein said storage module stores image data as a part of HTML data.

7. The camera server according to claim 5, wherein said search module includes a search program executed when the instruction is received from a remote client.

8. The camera server according to claim 5, wherein said image data transfer module transfers image data via internet.

9. The camera server according to claim 8, wherein said image data transfer module transfers the image data by HTTP protocol.

10. The camera server according to claim 5, wherein said storage module also stores image sensing date information, and
    said search module makes a search using a time zone as a search condition when the instruction includes the time zone information.

11. The camera server according to claim 5, wherein said camera server senses an image within a photographable range by sequentially changing an angle of the camera device when a pre-set time is reached.

12. A camera client connected to a camera server in turn connected to a camera device, an angle of which can be freely controlled, where the camera server stores in predetermined storage means a plurality of image data together with image sensing angle information for each of the plurality of image data, said camera client comprising:
    an input module that inputs angle information as search information;
    a transfer module that transfers the input search information to the camera server during a time another remote client is controlling operation of the camera device; and
    a display module that displays image data stored in the predetermined storage means, and found by and transferred from said camera server.

13. The camera client according to claim 12, wherein said input module inputs the angle information in an address input area of a predetermined browser.

14. The camera client according to claim 12, wherein said camera server also stores image sensing date information in said predetermined storage means in association with the image data, and
    said input module inputs image sensing time zone information as a search condition.

15. A method of controlling a camera server for use with a camera device, an angle of which can be freely controlled, and where the camera server transfers an image sensed by the camera device to a remote client in accordance with an instruction from the remote client, the method comprising:

the storage step of storing in predetermined storage means a plurality of image data sensed by the camera device and angle information for each of the plurality of image data;

the search step of searching the storage means in accordance with the angle information in the instruction when the instruction is received from the remote client during a time another remote client is controlling operation of the camera device; and the image data transfer step of transferring the image data found in the search step to the remote client.

16. The method according to claim 15, wherein the storage step includes storing image sensing date information, and the search step includes making a search using a time zone as a search condition when the time zone information is included in the instruction.

17. The method according to claim 15, further comprising the step of sensing an image within a photographable range by sequentially changing an angle of the camera device when a pre-set time is reached.

18. A method of controlling a camera client connected to a camera server in turn connected to a camera device, an angle of which can be freely controlled, where the camera server stores in predetermined storage means a plurality of image data sensed by the camera device together with image angle information for each of the plurality of image data, the method comprising:

the input step of inputting angle information as search information;

the transfer step of transferring the input search information to the camera server during a time another remote client is controlling operation of the camera device; and the display step of displaying image data found in the predetermined storage means of the camera server in accordance with said transfer step.

19. The method according to claim 18, wherein the camera server also stores image sensing date information in the predetermined storage means in association with the plurality of image data, and the input step also includes inputting image sensing time zone information as a search condition.

20. A storage medium that stores a program for implementing operation of a camera server connected to a camera device, an angle of which can be freely controlled, where the camera server transfers an image sensed by the camera device to a remote client in accordance with an instruction from the remote client, where the storage medium stores program codes which respectively implement the following steps:

storing in predetermined storage means a plurality of image data sensed by the camera device and angle information for each of the plurality of image data;

searching the predetermined storage means in accordance with the angle information in the instruction when the instruction is received from the remote client during a time another remote client is controlling operation of the camera device; and transferring the image data found in the search step to the remote client.

21. A storage medium that stores a program for implementing operation of a camera client connected to a camera server in turn connected to a camera device, an angle of which can be freely controlled, where the camera server stores in predetermined storage means a plurality of image data sensed by the camera device together with angle information for each of the plurality of image data, said storage medium storing program codes which respectively implement the following steps:

inputting from the remote client angle information as search information;

transferring the input search information to the camera server during a time another remote client is controlling operation of the camera device; and displaying image data found and transferred from the camera server in the transfer step.

* * * * *

UNITED STATES PATENT AND TRADEMARK OFFICE
CERTIFICATE OF CORRECTION

PATENT NO.     : 6,567,121 B1                                                Page 1 of 1
DATED          : May 20, 2003
INVENTOR(S)    : Tomoko Kuno It is certified that error appears in the above-identified patent and that said Letters Patent is hereby corrected as shown below:

Column 1,
Line 9, "method," should read -- method --.

Column 5,
Line 23, "browser program" should read -- browser programs --.

Column 7,
Line 13, "charts" should read -- chart --.
Line 30, "date" should read -- data --.

Signed and Sealed this

Twenty-first Day of October, 2003

JAMES E. ROGAN
*Director of the United States Patent and Trademark Office*